United States Patent  
Wiechert et al.

[11] 3,916,001  
[45] Oct. 28, 1975

[54] 15α,16α-METHYLENE-10-NOR-18-METHYL-4-PREGNENES
[75] Inventors: Rudolf Wiechert; Walter Elger, both of Berlin, Germany
[73] Assignee: Schering Aktiengesellschaft, Berlin and Bergkamen, Germany
[22] Filed: Sept. 11, 1973
[21] Appl. No.: 396,141

[30] Foreign Application Priority Data  
Sept. 21, 1972 Germany............................ 2246462

[52] U.S. Cl. .......... 260/397.4; 424/243; 260/397.3; 260/239.55 C
[51] Int. Cl.² .................... C07J 71/00; A61K 31/56
[58] Field of Search.... Machine Searched Steroids; 260/397.4

[56] References Cited  
UNITED STATES PATENTS  
3,438,975 4/1969 Edwards........................ 260/239.55  
3,717,663 2/1973 Coombs et al................... 260/397.5  
3,764,615 10/1973 Hauser............................ 260/397.4

Primary Examiner—Elbert L. Roberts  
Attorney, Agent, or Firm—Millen, Raptes & White

[57] ABSTRACT

15α, 16α-methylene-4-pregnenes of the formula

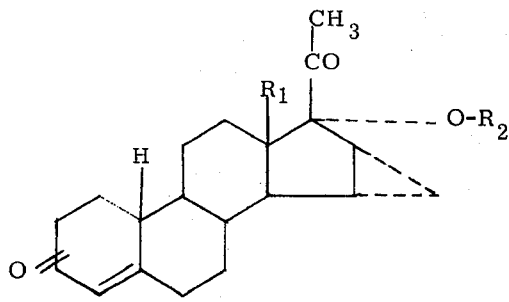

wherein $R_1$ is a lower alkyl and $R_2$ is alkanoyl of 1–18 carbon atoms have gestagenic activity.

5 Claims, No Drawings

15α,16α-METHYLENE-10-NOR-18-METHYL-4-PREGNENES

BACKGROUND OF THE INVENTION

This invention relates to novel steroids, and more particularly relates to 15α,16α-methylene-4-pregnenes having useful pharmaceutical properties.

OBJECTS OF THE INVENTION

An object of this invention is to provide novel steroid compounds having valuable hormone activity.

Another object of this invention is to provide novel steroid compounds having improved progesterone activity over known progestational agents.

A further object of this invention is to provide novel steroid compounds having contraceptive activity.

An additional object of this invention is to provide a process for producing the novel steroids compounds.

Upon further study of the specification and appended claims, further objects and advantages of this invention will become apparent to those skilled in the art.

SUMMARY OF THE INVENTION

Briefly, the above and other objects are attained in one aspect of the invention by providing 15α,16α-methylene-4-pregnenes of Formula I

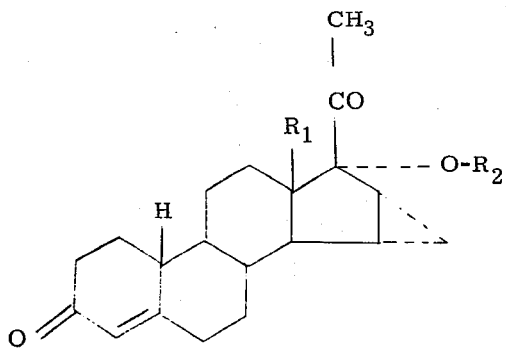

wherein
$R_1$ is a lower alkyl and
$R_2$ is alkanoyl of 1–18 carbon atoms.

DETAILED DISCUSSION

Suitable lower alkyls for $R_1$ in Formula I are those of 1–5 carbon atoms, i.e. methyl, ethyl, propyl, butyl, and pentyl, and, preferably, methyl and ethyl.

$R_2$ in the above Formula I is a suitable physiologically compatible acyl residue derived from acids customarily employed for the esterification of steroid alcohols. Preferred acyl residues are alkanoyls of 1–18 carbon atoms derived from organic carboxylic acids of 1–18 carbon atoms, which can be saturated or unsaturated, mono- or polybasic, and/or substituted with at least one suitable substituent, such as, alkyl, hydroxy, oxo, amino, or halogen. The carboxylic acids are, e.g., formic, acetic, propionic, butyric, isobutyric, valeric, isovaleric, caproic, enanthic, caprylic, pelargonic, capric, undecylic, lauric, tridecylic, myristic, pentadecylic, palmitic, stearic acid, etc.; branched carboxylic acids, e.g., trimethylacetic acid, diethylacetic acid, tert.-butylacetic acid, etc.; unsaturated acids, e.g. oleic acid.

It will be appreciated by those skilled in the art that many equivalents of the above alkanoyl acyl radicals can be substituted therefor and are the equivalent thereof. Typically, such equivalent acyl radicals are those of any physiologically acceptable organic or inorganic acids derived by removal of a hydroxyl group therefrom, including carbocyclic or heterocyclic acyl containing one or two separate or fused rings, e.g., benzoyl, p-methoxy-benzoyl, piperidino, morpholino and the like lower alkanoyls, cycloalkanoyl, etc. Suitable equivalent acyl residues $R_2$ are those derived from acids which include, but are not limited to, organic alicyclic, aromatic, or heterocyclic carboxylic acids having 4 to 15 carbon atoms which can be saturated or unsaturated, mono- or polybasic and/or substituted, e.g., by at least one suitable substituent, such as alkyl, hydroxy, oxo, amino, or halogen.

The customary inorganic acid residues can likewise be included herein, which include but are not limited to residues derived from sulfuric acid, phosphoric acid, etc.

Specific such equivalent organic acids are cycloaliphatic carboxylic acids, e.g., cyclopentylacetic acid, cyclohexylacetic acid, etc.; substituted carboxylic acids, e.g., mono-, di-, and trichloroacetic acid, aminoacetic acid, diethylaminoacetic acid, piperidinoacetic acid, morpholinoacetic acid, lactic acid; polybasic carboxylic acids, e.g., succinic acid, adipic acid, etc.; aromatic and heterocyclic carboxylic acids, e.g., benzoic acid, nicotinic acid, isonicotinic acid, furan-2-carboxylic acid, etc.

Preferred compounds of this invention are those compounds of Formula I in which $R_1$ is ethyl and b. $R_2$ is a lower alkanoyl of up to 12 carbon atoms.

Compounds of this invention, in addition to those shown in the following examples, include: 17-propionyloxy-18-methyl-15α,16α-methylen-19nor-4-pregnene-3,20-dione, 17-butyryloxy-18-methyl-15α,16α-methylen-19-nor-4-pregnene-3,20-dione, 17-heptanoyloxy-18-methyl-15α,16α-methylen-19-nor-4-pregnene-3,20-dione, 17-propionyloxy-15α,16α-methylen-19-nor-4-pregnene-3,20-dione, 17-butyryloxy-15α,16α-methylen-19-nor-4-pregnene-3,20-dione, 17-heptanoyloxy-15α,16α-methylen-19-nor-4-pregnene-3,20-dione, 17-acetoxy-18-ethyl-15α,16α-methylen-19-nor-4-pregnen-3,20-dion.

The steroid compounds of the invention possess valuable hormone properties as shown in Table I wherein for example, 17-acetoxy-15α,16α-methylene-19-nor-4-pregnene-3,20-dione (I) and 17-acetoxy-18-methyl-15α,16α-methylene-19-nor-pregnene-3,20-dione (II) prove to be clearly superior in their progesterone activity over known progestational agents. They show, in the fertilization inhibition test upon subcutaneous administration, an effect which is superior to that of conventional compounds, as can be seen from the following comparison with 17β-acetoxy-17α-ethinyl-4-estren-3-one (III) and 17β-hydroxy-18-methyl-17α-ethinyl-4-estren-3-one (IV). The fertilization inhibition test is described in W. Elger et al. Acta endocrinol., suppl. 152 (1971) 71.

TABLE 1

Fertilization Inhibition Test

| | | Relative Effectiveness (Progesterone = 1) |
|---|---|---|
| I | 17-Acetoxy-15α,16α-methylene-19-nor-4-pregnene-3,20-dione | 30 |
| II | 17-Acetoxy-18-methyl-15α,16α-methylene-19-nor-4-pregnene-3,20-dione | 30 |
| III | 17β-Acetoxy-17α-ethinyl-4-estren-3-one | 0.3 |
| IV | 17β-Hydroxy-18-methyl-17α-ethinyl-4-estren-3-one | 10 |

The higher esters are furthermore distinguished by protracted effectiveness as can be seen from the results in Table 2 of the customary protracted Clauberg test, described in R. I. Dorfman, Methods in Hormone Research, Academic Press, New York and London, 1962, Vol. II. P. 127 f. Thus, for example, 17-hexanoyloxy-15α,16α-methylene-19-nor-4-pregnene-3,20-dione (V) and 17-hexanoyloxy-18-methyl-15α,16α-methylene-19-nor-4-pregnene-3,20-dione (VII) have superior protracted effectiveness as compared with the corresponding desmethylene compounds 17-hexanoyloxy-19-nor-4-pregnene-3,20-dione (VI) and 17-hexanoyloxy-18-methyl-19-nor-4-pregnene-3,20-dione (VIII).

TABLE 2

| Number | Substance | Dose (mg.) | McPhail Value* |
|---|---|---|---|
| V | 17-Hexanoyloxy-15α,16α-methylene-19-nor-4-pregnene-3,20-dione | 3 | 3.8 (7th day) 2.0 (13th day) |
| VI | 17-Hexanoyloxy-19-nor-4-pregnene-3,20-dione | 3 | 3.3 (7th day) 1.3 (13th day) |
| VII | 17-Hexanoyloxy-18-methyl-15α,16α-methylene-19-nor-4-pregnene-3,20-dione | 1 | 3.5 (8th day) |
| VIII | 17-Hexanoyloxy-18-methyl-4-pregnene-3,20-dione | 1 | 3.2 (8th day) |

*McPhail scale: 1 = no effect; 4 = complete transformation of endometrium (gestagenic activity).

Since the compounds of the present invention exhibit superior progestational and fertilization inhibition (contraceptive effect), they can be used as pharmaceuticals. Accordingly, the use of the compounds of this invention as drugs, and/or in drugs, and/or as contraceptives, is likewise the subject of the present invention.

The compounds of this invention, when used for example, in contraceptive preparations, are employed either in combination with an estrogen-effective hormone component, e.g. ethinylestradiol, or as the sole effective component with a dose of 0.01 – 2 mg.

The steroid compounds of the invention possessing progestational properties can be advantageously employed for the treatment of the following gynecological conditions : primary and secondary amenorrhea, endometriosis, hypoplasia uteri, functional bleeding, glandular cystic hyperplasia, sterility caused by dysfunction of the corpus luteum, cycle aberrations, premenstrual discomforts, mastopathia, as well as contraception.

The novel steroid compounds of this invention can be employed in mixture with conventional excipients, i.e., pharmaceutically acceptable organic or inorganic carrier substances suitable for parenteral, enteral or topical application which do not deleteriously react with the active compounds. Suitable pharmaceutically acceptable carriers include, but are not limited to, water, salt solutions, alcohols, vegetable oils, polyethylene glycols, gelatin, lactose, emylose, magnesium stearate, talc, silicic acid, viscous paraffin, perfume oil, fatty acid monoglycerides and diglycerides, pentaerythritol fatty acid esters, hydroxy methylcellulose, polyvinyl pyrrolidone, etc. The pharmaceutical preparation can be sterilized and if desired mixed with auxiliary agents, e.g., lubricants, preservatives, stabilizers, wetting agents, emulsifiers, salts for influencing osmotic pressure, buffers, coloring, flavoring and/or aromatic substance and the like which do not deleteriously react with the active compounds.

For parenteral application, particularly suitable are solutions, preferably oily, e.g., sesame oil or castor oil which can contain additionally a diluent, e.g. benzyl benzoate or benzyl alcohol, or aqueous solutions, as well as suspensions, emulsions, or implants, including suppositories. Ampoules are convenient unit dosages.

For oral administration, particularly suitable are tablets, dragees, capsules or pills having talc and/or a carbohydrate carrier or binder or the like, the carrier preferably being lactose and/or corn starch and/or potato starch. A syrup, elixir, or the like can be used wherein a sweetened vehicle is employed. Sustained release compositions can be formulated including those wherein the active compound is protected with differentially degradable coatings, e.g., by microencapsulation, multiple coatings, etc.

Generally, the compounds of the invention are dispensed in unit dosage form comprising 0.5–250 mg. of a pharmaceutical carrier per each unit dosage, and the amount per unit dosage is about 0.01 mg. to 20 mg. preferably about 0.02 to 10 mg., of active agent of this invention. Preferably, with a tablet 0.01 to 5 mg. is preferred, and solutions for parenteral applications, 0.1 to 10 mg/ml. of solution.

The compounds of this invention are generally administered to animals, including but not limited to mammals, e.g., humans. A gestagenically effective daily dosage of the active compounds as administered orally to humans generally comprises about 0.0002–0.2 mg/kg. of body weight, together with 10–500 mg. of pharmaceutically acceptable carrier. The dose can be administered singly or as divided dosages throughout the day.

The usefulness of the compounds of this invention as gestagenic agents has been established in laboratory test animals. Oral administration is preferred for gestagenically active compounds, the compounds of this invention being particularly valuable in the treatment of humans afflicted with gynaecological disturbances or for preventing conception. In this regard, the compounds of this invention can be employed in substantially the same manner as the known progestational agents of Table 1.

The invention furthermore relates to a process for the production of 15α,16α-methylene-4-pregnenes of the general Formula I, comprising esterification, in a conventional manner, of a 17-hydroxy-15α,16α-methylene-4-pregnene of the general Formula II

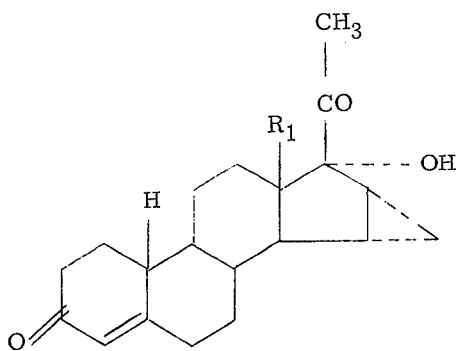

wherein $R_1$ has the above-indicated values

The esterification of the hydroxy group in the 17-position is effected by the methods usually employed for the esterification of steroid alcohols in steroid chemistry Examples are the 17-position hydroxy esterification with an acid or with a reactive acid derivative, such as an acid anhydride or halogenide, or mixtures thereof, in the presence of a strongly acidic esterification catalyst, e.g., p-toluenesulfonic acid, perchloric acid, trifluoroacetic acid, or in the presence of a basic esterification catalyst, such as pyridine, collidine, quinoline, and the like at temperatures of preferably above room temperature.

Without further elaboration, it is believed that one skilled in the art can, using the preceding description, utilize the presence invention to its fullest extent. The following preferred specific embodiments are, therefore, to be construed as merely illustrative, and not limitative of the remainder of the disclosure in any way whatsoever.

Starting compounds of general Formula II can be prepared as demonstrated by the following Examples A and B.

For the starting materials, and intermediates suitable in the preparation of the compounds of this invention, see also copending U.S. Pat. application Ser. No. 331,059 filed Feb. 9, 1973, now abandoned.

In the following preparations, reference to "natural" compounds is defined as having the steric configuration of the naturally occuring optically active pregnane steroids. A: 17-Hydroxy-18-methyl-15α,16α-methylene-19-nor-4-pregnene-3,20-dione 46.2 g. of natural 18-methyl-19-nor-4,16-pregnadiene-3,20-dione is refluxed in 2.5 l of benzene with 37.1 g. of 2,2-dimethyl-1,3-propanediol and 2.7 g. of p-toluenesulfonic acid for 6 hours with the use of a water trap. After cooling, the reaction solution is washed with saturated sodium bicarbonate solution and water, dried over sodium sulfate, and evaporated to dryness under vacuum. The thus-obtained residue is chromatographed on silica gel. After recrystallization from diisopropyl ether, 28.6 g. of natural 3,3-(2',2'-dimethyl-1',3'-propylenedioxy)-18-methyl-19-nor-5,16- or -5(10),16-pregnadien-20-one is obtained, m.p. 145°–155°C.

UV: $\epsilon_{243} = 8,530$.

Within 30 minutes, 38.2 g. of natural 3,3-(2',2'-dimethyl-1',3'-propylenedioxy)-18-methyl-19-nor-5,16- or -5(10),16-pregnadien-20-one, dissolved in 229 ml. of tetrahydrofuran, is added dropwise to a solution, cooled to −20°C., of 29.2 g. of potassium tert.-butylate in 343 ml. of dimethylformamide, 57 ml. of absolute tert.-butanol, 22.9 ml. of trimethylphosphite, while passing oxygen through the reaction mixture. Then, the latter is agitated for another hour at −20°C. while continuing the oxygen introduction. The reaction solution is then stirred into weakly acetic ice water; the thus-obtained precipitate is filtered off, washed well with water, dissolved in methylene chloride, and dried over sodium sulfate. The residue obtained after evaporation is chromatographed on silica gel and after recrystallization from diisopropyl ether/methylene chloride, 15.5 g. of natural 17-hydroxy-3,3-(2',2'-dimethyl-1',3'-propylenedioxy)-18-methyl-19-nor-5,15-or -5(10),15-pregnadien-20-one is obtained, m.p. 202°–214°C.

14.0 g. of natural 17-hydroxy-3,3-(2',2'-dimethyl-1',3'-propylenedioxy)-18-methyl-19-nor-5,15- or -5(10),15-pregnadien-20-one is dissolved in 140 ml. of absolute tetrahydrofuran, mixed with 14.0 g of lithium tri-tert.-butoxy alanate, and allowed to stand for 1 hour at room temperature. The reaction solution is stirred into ice water, acidified with dilute sulfuric acid, and extracted with methylene chloride. The crude product obtained after drying and evaporation is chromatographed on silica gel, thus producing 13.0 g. of natural 17,20 ξ-dihydroxy-3,3-(2',2'-dimethyl-1',3'-propylenedioxy)-18-methyl-19-nor-5,15- or -5(10),15-pregnadiene.

10.4 g. of natural 17,20 ξ-dihydroxy-3,3-(2',2'-dimethyl-1',3'-propylenedioxy)-18-methyl-19-nor-5,15- or -5(10),15-pregnadiene is heated for 5 hours under reflux in 185 ml. of absolute ether and 185 ml. of absolute ethylene glycol dimethyl ether with 16.8 ml. of methylene iodide and 20.8 g. of zinc-copper. The reaction mixture is then diluted with methylene chloride, washed with saturated ammonium chloride solution and water, dried over sodium sulfate, and evaporated to dryness under vacuum. The residue is chromatographed on silica gel, thus obtaining 6.8 g. of natural 17,20 ξ-dihydroxy-3,3-(2',2'-dimethyl-1',3'-propylenedioxy)-18-methyl-15α,16α-methylene-19-nor-5- or -5(10)-pregene. 3.0 g. of natural 17,20 ξ-dihydroxy-3,3-92',2'-dimethyl-1',3'-propylenedioxy)-18-methyl-15α,16α-methylene-19-nor-5- or -5(10)-pregnene is combined under agitation at 15° C. within 15 minutes in 90 ml. of dimethyl sulfoxide and 8.25 ml. of triethylamine with a solution of 6.0 g. of pyridine-SO$_3$ complex in 22.5 ml. of dimethyl sulfoxide, and the mixture is further agitated for 1 hour at room temperature. The mixture is then stirred into weakly acetic ice water; the thus-obtained precipitate is filtered off, washed with water, and taken up in methylene chloride. After drying and evaporation, the residue is chromatographed on silica gel, thus producing 2.8 g. of natural 17-hydroxy-3,3-(2',2'-dimethyl-1',3'-propylenedioxy)-18-methyl-15α,16α-methylene-19-nor-5- or -5(10)-pregnen-20-one.

2.4 g. of natural 17-hydroxy-3,3-92',2'-dimethyl-1',3'-propylenedioxy)-18-methyl-15α,16α-methylene-19-nor-5- or -5(10)-pregnen-20-one is dissolved in 120 ml. of methanol with 2.4 g. of oxalic acid in 2.4 ml. of water, stirred, and heated under reflux for 2.5 hours. After ice water precipitation, the thus-produced sediment is filtered off, washed with water, and taken up in methylene chloride. After drying and evaporation, the product is recrystallized from ethyl acetate, thus obtaining 1.43 g. of natural 17-hydroxy-18-methyl- 15α,16α-methylene-19-nor-4-pregnene-3,20-dione, m.p. 207°–209.5°C.

UV: $\xi_{240} = 17,400$.

B:
17-Hydroxy-15α,16α-methylene-19-nor-4-pregnene-3,20-dione 5.0 g. of 19-nor-4,16-pregnadiene-3,20-dione is refluxed in 250 ml. of benzene with 4.0 g. of 2,2-dimethyl-1,3-propanediol and 300 mg. of p-toluenesulfonic acid for 2 hours with the use of a water trap. The reaction mixture is worked up as set forth in Example A. After chromatography on silica gel, 4.9 g. of 3,3-(2',2'-dimethyl-1',3'-propylenedioxy)-19-nor-5,16- or -5(10),16-pregnadien-20-one is obtained.

UV: $\xi_{239} = 9,200$.

5.0 g. of 3,3-(2',2'-dimethyl-1',3'-propylenedioxy)-19-nor-5,16- or -5(10),16-pregnadien-20-one is reacted, as described in Example A, with potassium tert.-butylate solution, oxygen, and trimethylphosphite at -5°C., and then worked up. After chromatographing the product on silica gel and recrystallization from diisopropyl ether/methylene chloride, 1.5 g. of 17-hydroxy-3,3-(2',2'-dimethyl-1',3'-propylenedioxy)-19-nor-5,15- or -5(10),15-pregnadien-20-one is produced, m.p. 241°–249°C.

44.5 g. of 17-hydroxy-3,3-(2',2'-dimethyl-1',3'-propylenedioxy)-19-nor-5,15- or -5(10),15-pregnadien-20-one is reacted in 440 ml. of absolute tetrahydrofuran with 45 g. of lithium tri-tert.-butoxyalanate, as described in Example A, and worked up. Chromatography on silica gel yields 37.6 g. of 17,20 ξ-dihydroxy-3,3-(2',2'-dimethyl-1',3'-propylenedioxy)-19-nor-5,15- or -5(10),15-pregnadiene. 35.6 g. of 17,20 ξ-dihydroxy-3,3-(2',2'-dimethyl-1',3'-propylenedioxy)-19-nor-5,15- or -5(10),15-pregnadiene is refluxed in 475 ml. of absolute ether and 475 ml. of absolute ethylene glycol dimethyl ether with 57.3 ml. of methylene iodide and 71.2 g. of zinc-copper for 6.5 hours under agitation. The reaction mixture is worked up as described in Example A. After chromatography on silica gel, the product is 17.7 g. of 17,20 ξ-dihydroxy-3,3-(2',2'-dimethyl-1',3'-propylenedioxy)-15α,16α-methylene-19-nor-5- or -5(10)-pregnene.

4.2 g. of 17,20 ξ-dihydroxy-3,3-(2',2'-dimethyl-1',3'-propylenedioxy)-15α,16α-methylene-19-nor-5- or -5(10)-pregnene is mixed in 126 ml. of dimethyl sulfoxide and 11.55 ml. of triethylamine under agitation at 15°C. within 20 minutes with a solution of 8.4 g. of pyridine-SO₃ complex in 31.5 ml. of dimethyl sulfoxide and thereafter stirred for 1 hour at room temperature. The reaction mixture is worked up as set forth in Example A. Chromatography on silica gel yields 3.1 g. of 17-hydroxy-3,3-(2',2'-dimethyl-1',3'-propylenedioxy)-15α,16α-methylene-19-nor-5- or -5(10)-pregnen-20-one.

3.0 g. of 17-hydroxy-3,3-(2',2'-dimethyl-1α,3α-propylenedioxy)-15α,16α-methylene-19-nor-5- or -5(10)-pregnen-20-one is reacted in 150 ml. of methanol with 3.0 g. of oxalic acid in 30 ml. of water, as indicated in Example A, and then worked up. Recrystallization from ethyl acetate yields 1.7 g. of 17-hydroxy-15α,16α-methylene-19-nor-4-pregnene-3,20-dione, m.p. 199°–202.5°C.

UV: $\xi_{240} = 17,000$.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

500 mg. of natural 17-hydroxy-18-methyl-15α,16α-methylene-19-nor-4-pregnene-3,20-dione is agitated at room temperature in a nitrogen stream for 18 hours in 10 ml. of acetic anhydride with 250 mg. of p-toluenesulfonic acid. The mixture is then stirred into pyridine-containing ice water; the thus-obtained precipitate is vacuum-filtered, washed with water, and taken up in methylene chloride. After drying and evaporation, the residue is taken up in 15 ml. of ethanol in order to split the enol acetate, mixed with 1.5 ml. of 8 vol.-% sulfuric acid, and refluxed for 30 minutes. After precipitation into ice water, the sediment is filtered off, washed with water, and taken up in methylene chloride. After drying and evaporation, the residue is chromatographed on silica gel, yielding 205 mg. of natural 17-acetoxy-18-methyl-15α,16α-methylene-19-nor-4-pregnene-3,20-dione, m.p. 163°–165°C.

UV: $\xi_{240} = 17,000$.

EXAMPLE 2

325 mg. of natural 17-hydroxy-18-methyl-15α,16α-methylene-19-nor-4-pregnene-3,20-dione is mixed in 10 ml. of absolute benzene and 0.65 ml. of caproic anhydride with 0.003 ml. of 70% strength perchloric acid and agitated for 2 hours at room temperature. The mixture is then diluted with ether, washed with water, dried, and evaporated to dryness. In order to split the enol ester, the residue is taken up in 10 ml. of methanol, combined with 2.5 ml. of 2N hydrochloric acid, and refluxed for 1 hour. After cooling, the mixture is diluted with ether, washer neutral with water, dried, and evaporated to dryness. The residue is chromatographed on silica gel, thus obtaining 260 mg. of natural 17-hexanoyloxy-18-methyl-15α,16α-methylene-19-nor-4-pregnene-3,20-dione as an oil.

UV: $\xi_{240} = 16,400$.

EXAMPLE 3

300 mg. of natural 17-hydroxy-18-methyl-15α,16α-methylene-19-nor-4-pregnene-3,20-dione is mixed in 10ml. of absolute benzene and 0.6 ml. of caprylic acid anhydride with 0.003 ml. of 70% perchloric acid and stirred at room temperature for 2 hours. The mixture is worked up as described in Example 2, and the enol ester is likewise split. After chromatography on silica gel, 210 mg. of natural 17-octanolyoxy-18-methyl-15α,16α-methylene-19-nor-4-pregnene-3,20-dione is obtained in the form of an oil.

UV: $\xi_{240} = 16,500$.

EXAMPLE 4

450 mg. of 17-hydroxy-15α,16α-methylene-19-nor-4-pregnene-3,20-dione is reacted in 9 ml. of acetic anhydride with 225 mg. of p-toluenesulfonic acid, as set forth in Example 1, and worked up. Chromatography on silica gel and recrystallization from isopropyl ether produces 285 mg. of 17-acetoxy-15α,16α-methylene-19-nor-4-pregnene-3,20-dione, m.p. 221°–223.5°C.

EXAMPLE 5

500 mg. of 17-hydroxy-15α,16α-methylene-10-nor-4-pregnene-3,20-dione is mixed in 15 ml. of absolute benzene and 1 ml. of caproic anhydride with 0.005 ml. of 70% perchloric acid and stirred for 1 hour at room temperature. The mixture is worked up as described in Example 2. After chromatography on silica gel and recrystallization from isopropyl ether, the product is 380 mg. of 17-hexanoyloxy-15α,16α-methylene-19-nor-4-pregnene-3,20-dione, m.p. 103°–104.5° C.

UV: $\xi_{240} = 17,000$.

EXAMPLE 6

400 mg. of 17-hydroxy-15α,16α-methylene-19-nor-4-pregnene-3,20-dione is reacted in 15 ml. of absolute benzene and 0.8 ml. of caprylic acid anhydride with 0.003 ml. of 70% strength perchloric acid, as described in Example 3, and then worked up. Chromatography on silica gel yields 270 mg. of 17-octanoyloxy-15α,16α-methylene-19-nor-4-pregnene-3,20-dione as an oil.

UV: $\xi_{240} = 16,600$.

EXAMPLE 7

One gram of 17-hydroxy-18-methyl-15α,16α-methylene-19-nor-4-pregnene-3,20-dione is introduced at 5° C. into a mixture of 1.2 g. of undecylic acid in 30 ml. of absolute benzene and 1.1 ml. of trifluoroacetic acid anhydride, and the mixture is heated to 60° C. for 2 hours. After cooling, the mixture is diluted with ether, and this solution is washed successively with saturated sodium bicarbonate solution, N/10 sodium hydroxide solution, and water, dried, and evaporated under vacuum. The residue is dissolved in 20 ml. of methanol, mixed with 0.2 ml. of concentrated hydrochloric acid, and refluxed for 45 minutes. The solution is diluted with ether, washed neutral with water, and evaporated under vacuum. Chromatography on silica gel yields 0.9 g. of 17-undecanoyloxy-18-methyl-15α,16α-methylene-19-nor-4-pregnene-3,20-dione as an oil.

UV:: $\xi_{240} = 16,700$.

EXAMPLE 8

A solution of 910 mg. of 17-hydroxy-15α,16α-methylene-19-nor-4-pregnene-3,20-dione in 19 ml. of collidine and 5 g. of lauric anhydride is heated to the boiling point for 5 hours under a nitrogen atmosphere. After cooling, the mixture is poured into ice water and extracted with methylene chloride. The extract is washed with dilute hydrochloric acid, sodium bicarbonate solution, and water, dried, and evaporated under vacuum. The residue is chromatographed on silica gel, thus obtaining 410 mg. of 17-dodecanoyloxy-15α,16α-methylene-19-nor-4-pregnene-3,20-dione as a viscous oil having a slightly yellow color.

UV: $\xi_{240} = 16,500$.

EXAMPLE 9

One gram of 17-hexanoyloxy-18-methyl-15α,16α-methylene-19-nor-4-pregnene-3,20-dione is dissolved in sesame oil. The solution is filled up with sesame oil to 1000 ml., filtered under aseptic conditions, and filled into 1 ml.-ampoules in the usual manner under sterile conditions. Thereafter, a post sterilization is conducted for 2 hours at 120° C.

EXAMPLE 10

10 g. of 17-hexanoyloxy-15α,16α-methylene-19-nor-4-pregnene-3,20-dione is dissolved in a mixture of castor oil/benzyl benzoate (6:4), and the solution is then replenished to 1000 ml. The aseptically filtered solution is then filled into 1 ml.-ampoules in the usual manner under sterile conditions. The ampoules are finally subjected to a secondary sterilization at 120° C. for 2 hours.

EXAMPLE 11

2 g. of 17-acetoxy-18-methyl-15α,16α-methylene-19-nor-4-pregnene-3,20-dione is dissolved in a mixture of castor oil/benzyl benzoate (6:4) and then replenished to 1000 ml. of solution. The aseptically filtered solution is customarily filled into 1 or 2 ml.-ampoules under sterile conditions. The ampoules are then post sterilized for 2 hours at 120° C.

EXAMPLE 12

Composition of a Tablet

| | |
|---|---|
| 0.02 mg. | 17-Acetoxy-18-methyl-15α,16α-methylene-19-nor-4-pregnene-3,20-dione |
| 63.68 mg. | Lactose |
| 15.0 mg. | "Avicel" |
| 1.0 mg. | Talc |
| 0.3 mg. | Magnesium stearate |
| 80.00 mg. | Total weight of the tablet |

EXAMPLE 13

Composition of a Mating Capsule 0.100 mg. of 17-acetoxy-15α,16α-methylene-19-nor-4-pregnene-3,20-dione is mixed with 200–210 mg. of lactose and filled into mating capsules, size 3.

EXAMPLE 14

Composition of a Dragee

| | |
|---|---|
| 1.000 mg. | 17-Acetoxy-18-methyl-15α,16α-methylene-19-nor-4-pregnene-3,20-dione |
| 31.000 mg. | Lactose |
| 18.425 mg. | Corn starch |
| 2.060 mg. | Polyvinylpyrrolidone 25 |
| 0.010 mg. | Methyl p-hydroxybenzoate |
| 0.005 mg. | Propyl p-hydroxybenzoate |
| 2.500 mg. | Talc |
| 55.000 mg. | Total weight of the tablet, which is made into a dragee of about 90 mg. with the usual sugar mixture. |

EXAMPLE 15

Composition of a Tablet

| | |
|---|---|
| 0.030 mg. | 17α-Ethinylestradiol |
| 0.100 mg. | 17-Acetoxy-18-methyl-15α,16α-methylene-19-nor-4-pregnene-3,20-dione |
| 33.000 mg. | Lactose |
| 18.000 mg. | Corn starch |
| 2.100 mg. | Polyvinylpyrrolidone |
| 1.670 mg. | Talc |
| 0.100 mg. | Magnesium stearate |
| 55.000 mg. | Total weight, supplemented to about 90 mg. with the usual sugar mixture. |

EXAMPLE 16
Composition of a Dragee for Combination-Type Sequential Preparation First Stage:
- 0.050 mg. 17α-Ethinylestradiol
- 0.020 mg. 17-Acetoxy-18-methyl-15α,16α-methylene-19-nor-4-pregnene-3,20-dione
- 33.180 mg. Lactose
- 18.000 mg. Corn starch
- 2.100 mg. Polyvinylpyrrolidone
- 1.650 mg. Talc
- 55.000 mg. Total weight, supplemented to about 90 mg. with the usual sugar mixture.

Second Stage:
- 0.050 mg. 17α-Ethinylestradiol
- 0.050 mg. 17-Acetoxy-18-methyl-15α,16α-methylene-19-nor-4-pregnene-3,20-dione
- 33.150 mg. Lactose
- 18.000 mg. Corn Starch
- 2.100 mg. Polyvinylpyrrolidone
- 1.650 mg. Talc
- 55.000 mg. Total weight, supplemented to about 90 mg. with the usual sugar mixture.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. 15α,16α-Methylene-4-pregnenes of the formula

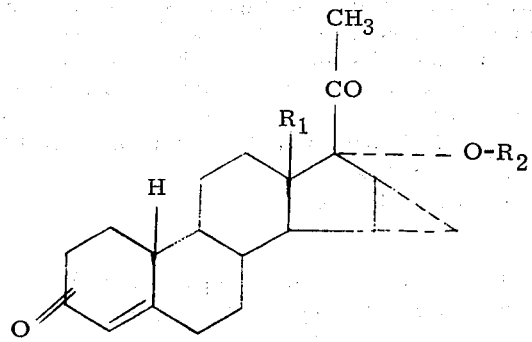

wherein
$R_1$ is ethyl and
$R_2$ is alkanoyl of 1-18 carbon atoms.

2. The compound of claim 1 wherein $R_2$ is acetyl.
3. The compound of claim 1 wherein $R_2$ is hexanoyl.
4. The compound of claim 1 wherein $R_2$ is octanoyl.
5. The compound of claim 1 wherein $R_2$ is undecanoyl.

* * * * *